Patented Oct. 11, 1932

1,881,697

UNITED STATES PATENT OFFICE

MAX ALBERT KUNZ, OF MANNHEIM, GERMANY, ASSIGNOR, BY MESNE ASSIGNMENTS, TO GENERAL ANILINE WORKS, INC., OF NEW YORK, N. Y., A CORPORATION OF DELAWARE

MANUFACTURE OF VAT DYESTUFFS OF THE ANTHRAQUINONE SERIES

No Drawing. Application filed February 9, 1926, Serial No. 87,173, and in Germany February 16, 1925.

I have found that valuable vat dyestuffs of excellent fastness are obtained by condensing aldehydes of the anthraquinone series with amino-anthraquinones or their substitution products. The reaction products are azo-methines corresponding to the general formula $$A_1-CH=N-A_2,$$

in which $A_1$ and $A_2$ are the same or different radicles of an anthraquinone which may be substituted or not.

I have further found that it is often advantageous to prepare the new dyestuffs by acting with anthraquinone aldehydes; not on the free amino-anthraquinones, but on their arylidene derivatives which are easily obtainable, for example, by condensing amino-anthraquinones with aldehydes of the benzene series. In the new reaction the arylaldehyde residue is replaced by the anthraquinone aldehyde radicle. The said reaction is of special value in case there are difficulties in the production of the new dyestuffs directly from a free amino-anthraquinone, for example, on account of the amino-anthraquinone being difficultly soluble.

The following examples will further illustrate how my invention may be carried out in practice, to which examples, however, the invention is not limited. The parts are by weight, if not otherwise stated.

Example 1

A hot solution of 22.3 parts of 2-amino-anthraquinone in 250 parts of nitrobenzene is added to 23.6 parts of 2-anthraquinone-aldehyde dissolved in 250 parts of boiling nitrobenzene. The mixture is boiled for 2 to 3 hours. On cooling a precipitate separates, which is filtered off by suction and washed. The product so obtained, having the formula

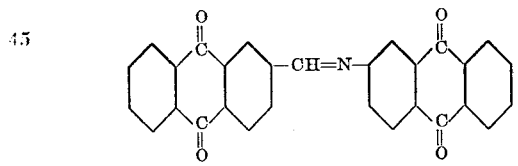

forms a brown powder which is soluble in the usual organic solvents with a brown colour. With alkaline hydrosulfite, a dark brownish violet vat is formed from which cotton is dyed fast orange shades.

Example 2

135 parts of 1-chlor-2-anthraquinone-aldehyde, 111.5 parts of 2-amino-anthraquinone and 2500 parts of nitrobenzene are heated to boiling. After a short time the dyestuff is precipitated from the boiling liquor in the form of fine yellowish brown crystals which are worked up in the manner described in Example 1. The dyestuff so obtained dyes cotton from a violet-black vat yellow shades.

Example 3

22.3 parts of 2-amino-anthraquinone are introduced into a boiling solution of 25.1 parts of 1-amino-2-anthraquinone-aldehyde in 500 parts of nitrobenzene. The mixture is kept boiling for about 2 hours until the quantity of dyestuff formed is no longer increased. After cooling, the dyestuff, part of which separates while hot, is filtered by suction and washed with ethyl alcohol or treated with steam. It has the formula

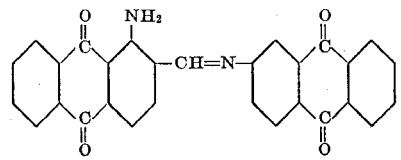

and forms a reddish brown powder melting at 348 to 349 degrees centigrade. With alkaline hydrosulfite, it forms an olive-black vat from which cotton is dyed the same shade which by washing and oxidation in the air is altered to a strong claret red of excellent fastness.

Example 4

A mixture of 25.1 parts of 1-amino-2-anthraquinone-aldehyde, 25.8 parts of 1-chlor-2-amino-anthraquinone and 600 parts of nitrobenzene is boiled for about 1½ hours, until the formation of dyestuff is finished. The product is worked up in the usual manner.

The dyeings produced with this dyestuff are claret red.

The reaction is carried out in a similar manner with other anthraquinone-aldehydes, for example with 1.4-diamino-2-anthraquinone-aldehyde.

Nitrobenzene may be replaced by other indifferent solvents such as, for example, chlorine, derivatives of benzene.

*Example 5*

A boiling solution of 11.2 parts of 2-amino-anthraquinone in 100 parts, by volume, of nitrobenzene is added to 15 parts of 1-azido-2-anthraquinone-aldehyde (obtainable according to Example 3 of the German Patent 396,509 by the action of nitrosyl chlorid on 1-amino-2-methyl-anthraquinone) dissolved in 150 parts, by volume, of boiling nitrobenzene. After boiling for one hour, the mixture is allowed to cool. It is worked up as described in the foregoing examples. The reaction product, having the formula

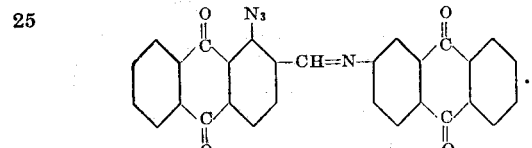

is a brown powder which may be recrystallized from high-boiling organic solvents in which it is soluble with a reddish brown color. It has a melting point of 331 to 333 degrees centigrade and dyes cotton from a dark brown vat dark brown shades, which color, by washing and oxidation, is altered to a deep salmon-color.

*Example 6*

56 parts of 2-benzylidene-amino-anthraquinone are introduced into a boiling solution of 59 parts of 2-anthraquinone-aldehyde in 1000 parts, by volume, of nitrobenzene, whereupon the mixture is boiled for 1½ hours. After cooling, the precipitated dyestuff is filtered off by suction. The dyestuff obtained which corresponds to the formula

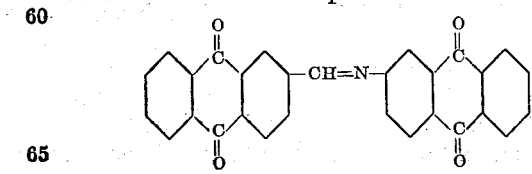

forms a brown powder which is soluble in the usual organic solvents with a brown color. With alkaline hydrosulfite, a dark brownish voilet vat is formed from which cotton is dyed fast orange shades.

*Example 7*

59 parts of 2-anthraquinone-aldehyde, 1000 parts of nitrobenzene and 86 parts of 1-chlor-2-benzylidene-amino-anthraquinone are boiled for ½ hour. The dyestuff so obtained is a brownish yellow powder melting above 350 degrees centigrade, and which dyes cotton from a violet-black vat fast orange shades.

*Example 8*

118 parts of 2-anthraquinone-aldehyde are dissolved in 1500 parts, by volume, of boiling nitrobenzene and mixed with a hot solution of 104 parts of 2.6-dibenzylidene-diamino-anthraquinone in 1000 parts, by volume, of nitrobenzene. After boiling for some minutes, a yellow precipitate separates from the brown solution, which precipitate, after the mixture is cooled, is filtered off and washed. The dyestuff, which corresponds to the following formula:

dyes cotton from an olive-black vat yellow shades of excellent fastness.

*Example 9*

125 parts of 1-amino-2-anthraquinone-aldehyde are dissolved in 2500 parts, by volume, of boiling nitrobenzene, whereupon a hot solution of 155 parts of 2-benzylidene-amino-anthraquinone in 1000 parts, by volume, of nitrobenzene is added. The mixture is boiled for ¾ hour. The dyestuff so obtained is identical with that described in Example 3.

*Example 10*

125 parts of 1-amino-2-anthraquinone-aldehyde, 3000 parts, by volume, of nitrobenzene and 175 parts of 2-(o-chlor-benzylidene-amino)-anthraquinone are boiled for ¾ hour. The reaction proceeds according to the following equation:

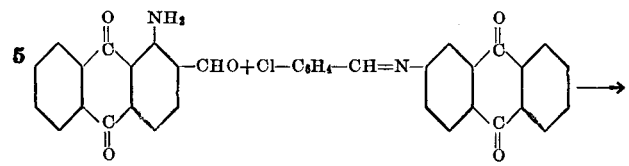

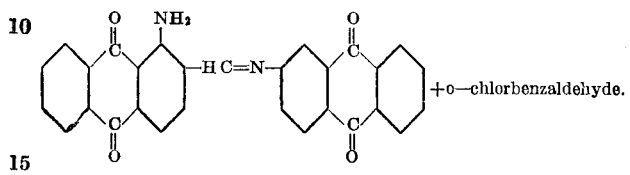

The product is worked up in the usual manner. It is identical with that obtained according to Example 3.

Example 11

62.5 parts of 1-amino-2-anthraquinone-aldehyde, 1500 parts, by volume, of nitrobenzene and 86.5 parts of 1-chlor-2-benzylidene-amino-anthraquinone are heated to boiling for 1 hour and worked up as usual. The dark reddish brown product melts at 352 to 354 degrees centigrade and is identical with the dyestuff described in Example 4.

Example 12

A mixture of 126 parts of 1-amino-2-anthraquinone-aldehyde, 3000 parts, by volume, of nitrobenzene and 163 parts of 2-benzylidene-amino-3-methyl-anthraquinone is boiled for ½ hour. The product is worked up as described in the foregoing examples. A chocolate brown crystalline powder is obtained which melts above 340 degrees centigrade and dyes cotton from an olive-black vat fast pink shades.

Example 13

A boiling solution of 50.2 parts of 1-amino-2-anthraquinone-aldehyde in 1000 parts, by volume, of nitrobenzene is mixed with a hot solution of 41.4 parts of 2.6-dibenzylidene-diamino-anthraquinone in 400 parts, by volume, of nitrobenzene. Almost immediately a voluminous reddish brown precipitate is separated from the boiling solution, which precipitate, after cooling, is filtered off and finished in the usual manner. The very pure product so obtained forms a reddish brown loose powder melting above 350 degrees centigrade and dyeing cotton from a violet-black vat fast claret red shades.

Example 14

A hot solution of 104 parts of 2.6-dibenzylidene-diamino-anthraquinone in 1000 parts, by volume, of nitrobenzene is introduced into a boiling solution of 135 parts of 1-chlor-2-anthraquinone-aldehyde in 1500 parts, by volume, of nitrobenzene. After some minutes, a fine crystalline yellow precipitate is separated from the boiling solution. The new product, which corresponds to the formula:

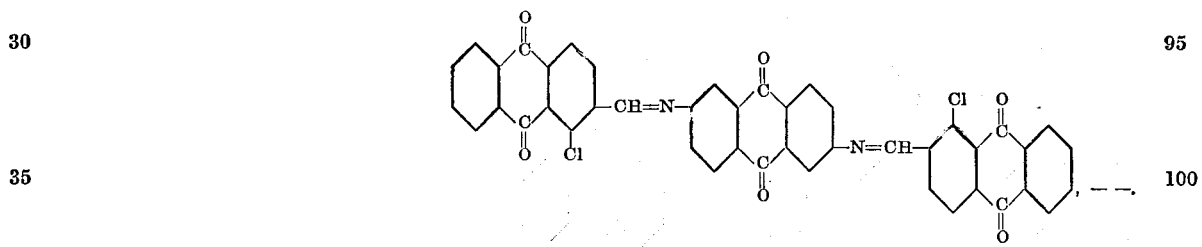

melts above 360 degrees centigrade and dyes cotton from a dark olive-brown vat yellow shades of excellent fastness.

The term "radicle of an anthraquinone" whenever used in the description and the following claims is meant to comprise radicles corresponding to the general formula

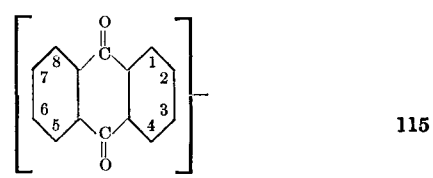

in which one or several of the numbered positions may be substituted.

I claim:
1. Azo methines of the type

$$A_1 - CH = N - A_2$$

in which $A_1$ and $A_2$ are radicles of an anthraquinone.

2. The process of producing new compounds of the anthraquinone series which comprises condensing an amino-anthraquinone with an anthraquinone aldehyde.

3. As a new product, an azomethine of the probable formula:

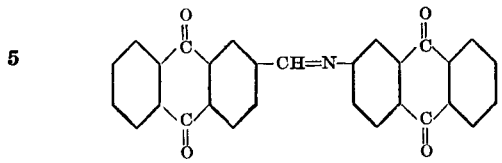

said product forming a brown powder which is soluble in the usual organic solvents with a brown color and forming with alkaline hydrosulfite a dark brownish violet vat from which cotton is dyed fast orange shades.

4. As a new product, an azomethine of the probable formula:

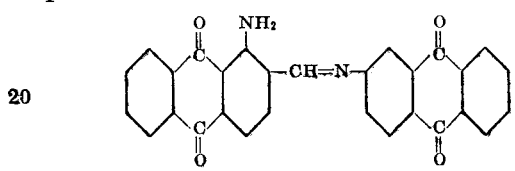

said product forming a reddish-brown powder which melts at 348–349° C. and forming with alkaline hydrosulfite an olive-black vat from which cotton is dyed the same shade which by washing and oxidation in the air is altered to a strong claret-red of excellent fastness.

5. As a new product, an azomethine of the probable formula:

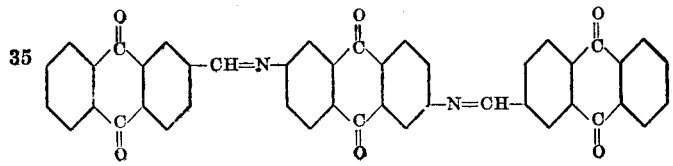

said product forming with alkaline hydrosulfite an olive-black vat from which cotton is dyed yellow shades of excellent fastness.

In testimony whereof I have hereunto set my hand.

MAX ALBERT KUNZ.